United States Patent [19]

Brown et al.

[11] Patent Number: 4,854,522

[45] Date of Patent: Aug. 8, 1989

[54] SAFETY APPARATUS

[75] Inventors: Louis R. Brown, Livonia; Wallace C. Higbee, Romeo, both of Mich.

[73] Assignee: TRW Vehicle Safety Systems Inc., Tyndhurst, Ohio

[21] Appl. No.: 177,077

[22] Filed: Apr. 4, 1988

[51] Int. Cl.$^4$ .............................................. B60R 22/34
[52] U.S. Cl. ................... 242/107.7; 242/107.6
[58] Field of Search ............. 242/107.6, 107.7, 107.12; 280/806, 807, 808; 297/475

[56] References Cited

U.S. PATENT DOCUMENTS

| | | | |
|---|---|---|---|
| 3,491,966 | 1/1970 | Curran et al. | 242/107.6 X |
| 3,598,335 | 8/1971 | Seager | 242/107.7 |
| 3,664,599 | 5/1972 | Partridge | 242/107.6 X |
| 3,682,412 | 8/1972 | Kuszynski | 242/107.6 X |
| 3,700,184 | 10/1972 | Francis | 242/107.6 X |
| 4,293,107 | 10/1981 | Ziv | 242/107.7 |
| 4,386,745 | 6/1983 | Patel et al. | 242/107.6 X |

*Primary Examiner*—John M. Jillions
*Attorney, Agent, or Firm*—Tarolli, Sundheim & Covell

[57] ABSTRACT

A vehicle safety apparatus includes a safety belt retractor having a reel which is urged to rotate in a belt retraction direction. A comfort assembly is operable between an engaged condition blocking rotation of the reel in the belt retraction direction and a disengaged condition. The comfort assembly includes a manually actuatable push button which initiates operation of the comfort assembly from the disengaged condition to the engaged condition. The comfort assembly also includes a blocking member which blocks movement of a pawl into engagement with a ratchet wheel until the push button has been actuated. The comfort assembly further includes a cam which also blocks movement of the pawl into engagement with the ratchet wheel until the reel has been rotated in a belt retraction direction through at least a major portion of a revolution of the reel. The comfort assembly accommodates limited movement of an occupant in a vehicle. However, if the movement of the occupant of the vehicle is effective to withdraw more than a predetermined length of belt from the reel, the comfort assembly is disengaged and cannot be reengaged until the push button is again actuated.

15 Claims, 6 Drawing Sheets

SAFETY APPARATUS

BACKGROUND OF THE INVENTION

The present invention relates to a vehicle safety belt retractor having a comfort assembly which relieves a tension force applied by the safety belt against the torso of an occupant of a vehicle.

A known vehicle safety belt retractor having a comfort assembly is disclosed in U.S. Pat. No. 4,386,745 issued June 7, 1983 and entitled Tension Reliever For Seat Belt Retractor. The comfort assembly disclosed in this patent is manually actuated after the belt is buckled by pulling a length of belt from the retractor to provide slack in the belt and then pulling on a handle. When the handle is pulled, a pawl immediately engages a ratchet wheel to hold a belt reel against rotation in a belt retracting direction under the influence of a biasing spring. Other known safety belt retractor assemblies having comfort assemblies which are engaged by movement of a manually actuatable member are disclosed in U.S. Pat. No. 3,598,335 issued Aug. 10, 1971 and entitled Seatbelt Retractor and in U.S. Pat. No. 4,293,107 issued Oct. 6, 1981 and entitled Tension Relieving Selective Engagement With Memory.

SUMMARY OF THE INVENTION

The present invention provides a new and improved safety belt retractor having a reel which is biased to rotate in a belt retraction direction by a biasing spring. The retractor includes a comfort assembly operable from a disengaged condition to an engaged condition to block rotation of the reel in the belt retraction direction. The comfort assembly includes a push button which is manually actuatable to operate the comfort assembly from the disengaged condition to the engaged condition.

The comfort assembly includes a pawl which engages a ratchet wheel fixed to the reel to prevent rotation of the reel in the belt retraction direction. Prior to actuation of the push button, a blocking member blocks movement of the pawl into engagement with the ratchet wheel. Manual actuation of the push button moves the blocking member to a retracted condition in which it is ineffective to block engagement of the pawl with the ratchet wheel.

A cam is mounted for rotation about the reel axis. During initial withdrawal of the belt for engagement around the vehicle occupant, the reel rotates relative to the cam, and the cam has a blocking surface portion which prevents the pawl from engaging the ratchet wheel. Subsequent rotation of the reel in a belt retraction direction rotates the cam with the reel to a position in which the blocking surface is ineffective to block engagement of the pawl with the ratchet wheel. Thus, actuation of the push button and rotation of the reel in a belt retraction direction engages the comfort assembly.

When the comfort assembly is engaged, a predetermined short length of safety belt can be withdrawn from the reel and then retracted back onto the reel. This enables the occupant to move a limited distance without disengaging the comfort mechanism. However, if the length of the belt withdrawn from the reel is in excess of the predetermined short length, the cam, which rotates with the reel in the belt withdrawal direction, moves the pawl away from the ratchet wheel. The comfort assembly is thus operated to its disengaged condition. The push button must then be reactuated in order to reengage the comfort assembly.

BRIEF DESCRIPTION OF THE DRAWINGS

The foregoing and other features of the invention will become more apparent upon consideration of the following written description in connection with the accompanying drawings wherein.

DESCRIPTION OF ONE SPECIFIC PREFERRED EMBODIMENT OF THE INVENTION

General Description

A vehicle safety apparatus 10 (FIG. 1) includes a safety belt 12 and a seat belt retractor 14. The retractor 14 includes a generally U-shaped metal frame 16 having a pair of legs 18 and 20 which are interconnected by a base 22. A belt storage reel 24 is rotatable mounted on the frame 16.

Figure 1:
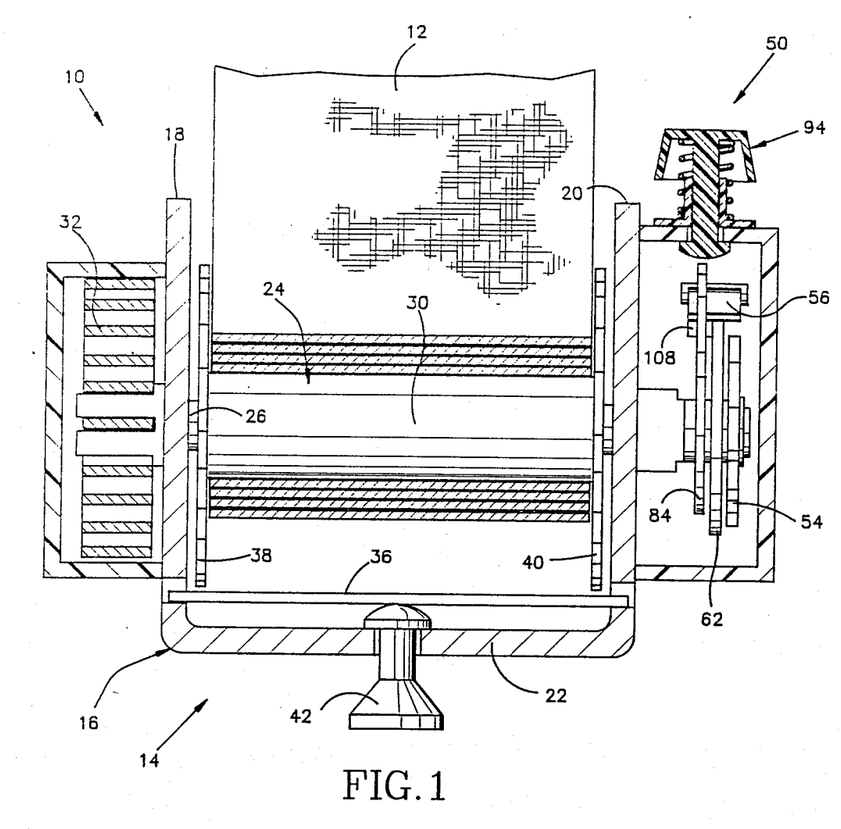
FIG. 1 is a sectional view illustrating the relationship between a safety belt, belt storage reel, reel biasing spring, and comfort assembly.

A cylindrical reel shaft 26 extends through circular openings in the legs 18 and 20 to support the reel 24 rotatably on the frame 16. The belt 12 is wound around a cylindrical hub 30 of the reel 24 which is supported by and is fixedly connected with the reel shaft 26. A spiral spring 32 is connected with one end of the reel shaft 26 and urges the reel 24 to rotate in a belt retraction direction, that is, in a direction to wind the belt around the hub 30 of the reel 24.

When the safety belt is to be used, it is unwound from the reel 24 against the force of the biasing spring 32 and pulled across the torso of an occupant of the vehicle. An end of the belt 12 carries a tongue which is received in a buckle to hold the belt 12 across the torso of an occupant. When the belt 12 is released from the buckle, the biasing spring 32 causes the reel 24 to rotate in the belt retraction direction to wind the belt 12 onto the reel 24.

The retractor 14 includes a locking pawl 36. The locking pawl 36 is engageable with a pair of ratchet wheels 38 and 40. The ratchet wheels 38 and 40 are fixedly connected with the reel shaft 26 and hub 30 of the reel 24. The locking pawl 36 is moved into engagement with the ratchet wheels 38 and 40 by a tiltable mass 42. Upon sudden deceleration of a vehicle in which the retractor assembly 14 is mounted, the mass 42 pivots relative to the frame 16 and causes the pawl 36 to move upwardly (as viewed in FIG. 1) into engagement with the ratchet wheels 38 and 40. Engagement of the pawl 36 with the ratchet wheels 38 and 40 locks the reel 24 against rotation in a belt withdrawal direction. This enables the belt 12 to restrain movement of an occupant of the vehicle due to the sudden deceleration.

It should be understood that the reel 24, locking pawl 36 and mass 42 have been illustrated schematically in FIG. 1. These components of the retractor 14 are well known and may be of any desired construction, such as illustrated in U.S. Pat. No. 4,632,331. Further, it should be understood that although the reel 24 of the retractor 14 is locked against rotation in a belt withdrawal direction by the pawl 36 in response to vehicle deceleration, the reel 24 could be locked in response to withdrawal of the safety belt 12 at a rate of acceleration above a predetermined rate if desired.

The retractor 14 includes a tension relief or comfort assembly 50 operable between an engaged condition and a disengaged condition. When the comfort assembly 50 is in the engaged condition, it blocks rotation of the reel 24 in the belt retraction direction under the influence of the biasing spring 32. This prevents the force of the belt 12 from acting against the torso of the occupant. When the comfort assembly 50 is in its disengaged condition, the comfort assembly 50 is ineffective to block rotation of the reel 24 under the influence of the biasing spring 32.

Figure 2:
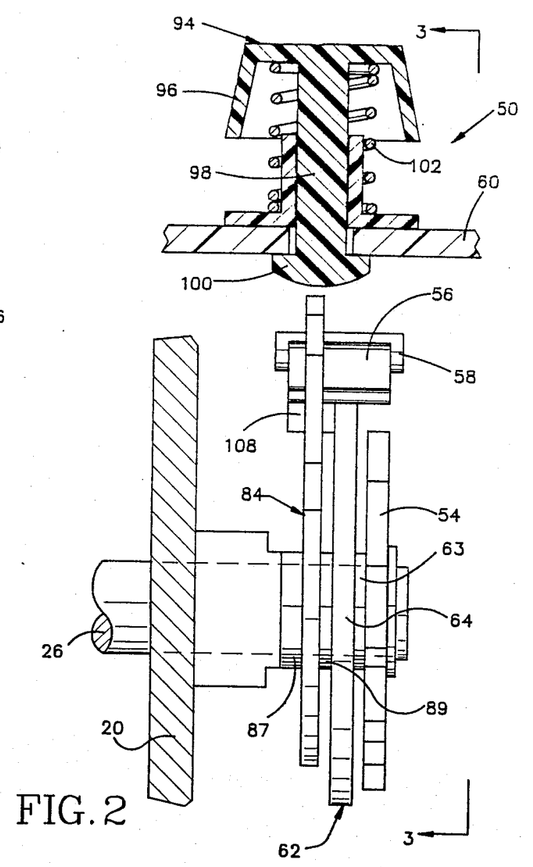
FIG. 2 is an enlarged fragmentary sectional view of the comfort assembly of FIG. 1.

The comfort assembly 50 includes a ratchet wheel 54 (FIGS. 2 and 3) which is fixed to the reel shaft 26. A tension eliminating pawl 56 is pivotally mounted at one end 58 (FIG. 3) on the retractor casing 60. The pawl 56 is movable between a disengaged position spaced from the ratchet wheel 54 and an engaged position in engagement with the ratchet wheel.

Figure 3:
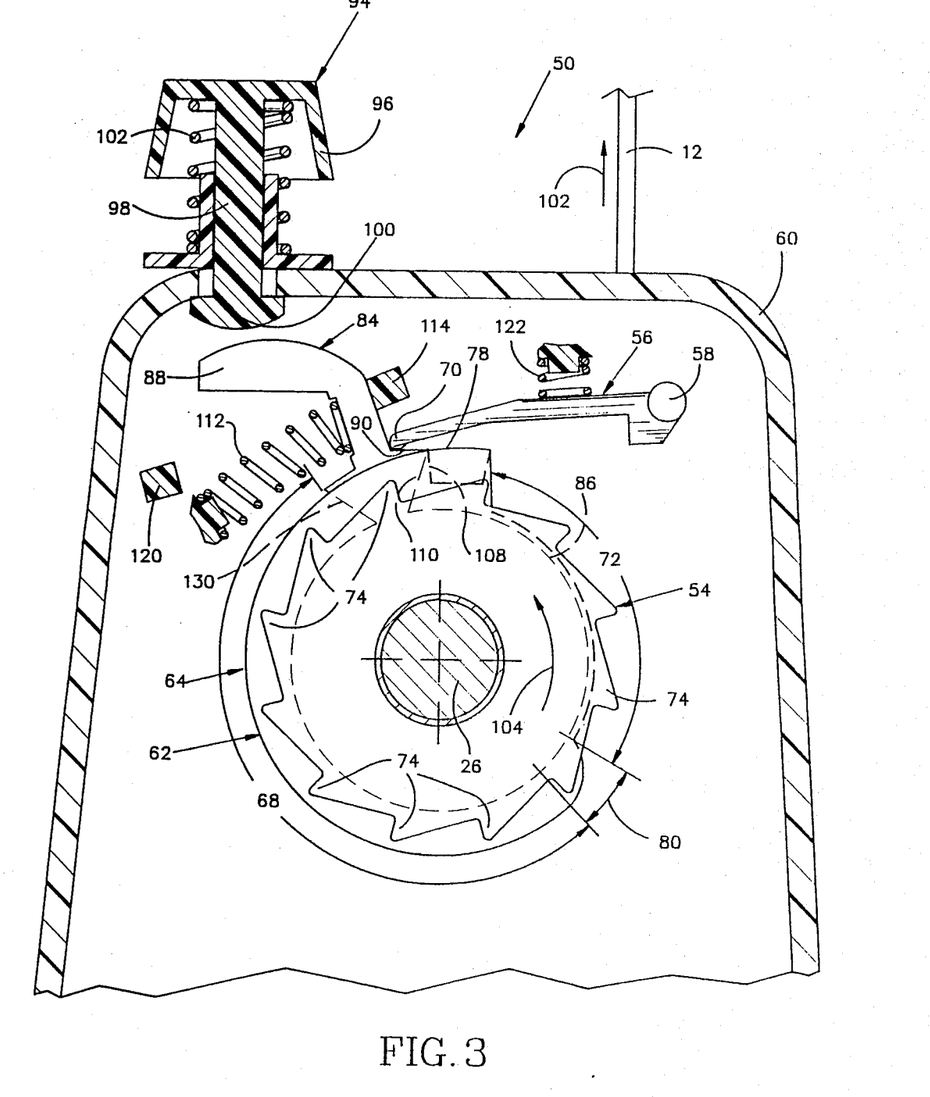
FIG. 3 is a side elevational view, taken generally along the line 3—3 of FIG. 2, further illustrating the construction of the comfort assembly, the comfort assembly being shown in a disengaged condition.

Prior to retraction of a predetermined length of the safety belt, a disc-shaped cam 62 holds the pawl 56 in a disengaged position spaced away from the ratchet wheel. The cam 62 is rotatably mounted on the reel shaft 26. Friction between the cam 62 and reel shaft 26 and between the cam 62 and a hub 63 on the ratchet wheel 54 is sufficient to rotate the cam 62 with the reel shaft 26 unless rotation of the cam 62 with the reel shaft 26 is blocked.

A blocking surface 64 on the cam 62 is engageable with the pawl 56 to hold the pawl 56 out of engagement with the ratchet wheel 54. The blocking surface 64 of the cam 62 includes a relatively long constant radius pawl hold out section, indicated at 68 in FIG. 3, which is engageable with a nose or outer end portion 70 of the pawl 56 to hold the pawl out of engagement with the ratchet wheel 54. The pawl hold out section 68 of the blocking surface 64 has an arcuate extent of approximately 185°.

The cam 62 also has a recess or open section 72 which exposes an annular array of teeth 74 on the ratchet wheel 54 for engagement by the end portion 70 of the pawl 56. The open section 72 of the cam 62 has an arcuate extent of approximately 110°. A lift section 78 of the blocking surface 64 increases in radius as it extends in a clockwise direction (as viewed in FIG. 3) from the hold out section 68 to the open section 72 of the cam 62. The lift section 78 has an arcuate extent of approximately 50°. A pawl release or ramp section 80 of the cam 62 increases in radius as it extends in a clockwise direction from the open section 72 to the pawl hold out section 68 and has an arcuate extent of approximately 15°.

It should be understood that the foregoing specific arcuate dimensions of the cam 62 have been set forth herein for purposes of clarity of description and not for purposes of limitation of the invention. It is contemplated that the cam 62 could have sections with arcuate extents which differ from the specific arcuate extents set forth above.

The comfort assembly 50 also includes a blocking member 84 (FIGS. 2 and 3) which is rotatably mounted on the reel shaft 26. The blocking member 84 has an annular mounting section 86 which has a hub 87 (FIG. 2) encircling the reel shaft 26. The blocking member 84 is rotatably supported on the reel shaft 26 by the hub 87. A hub 89 on the cam 62 engages the blocking member 84.

The blocking member 84 has an actuator section 88 (FIG. 3) which projects radially outwardly from the mounting section 86. The actuator section 88 has a shoulder 90. The shoulder 90 is located under the end portion 70 of the pawl 56, in the position of the parts shown in FIG. 3. Thus, the pawl 56 cannot engage the ratchet wheel 54.

A push button assembly 94 is manually actuatable to initiate operation of the comfort assembly 50 from its disengaged condition to its engaged condition. The push button assembly 94 includes a button 96 which has a cylindrical stem 98. A head end 100 is connected with the stem 98 and is engageable with the actuator section 88 of the blocking member 84. A coil spring 102 urges the push button assembly 94 to its initial or unactuated condition shown in FIG. 3.

Operation

When the safety belt 12 is withdrawn from the reel 24 against the influence of the biasing spring 32 (FIG. 1), it moves in the direction of the arrow 102 in FIG. 3. In addition, the reel 24, reel shaft 26 and ratchet wheel 54 rotate together in a counterclockwise direction, as indicated by the arrow 104 in FIG. 3. Also, cam 62 rotates in a counterclockwise direction due to the friction between the cam 62 and reel shaft 26 and ratchet wheel 54.

As the safety belt 12 is withdrawn, the shoulder 90 on the blocking member 84 remains beneath the end portion 70 of the pawl 56 and blocks engagement of the pawl 56 with the ratchet wheel 54. Rotation of the cam 62 with the reel 24 and ratchet wheel 54 is blocked by a stop lug 108 (FIGS. 2 and 3) on the cam 62. The stop lug 108 is pressed against an end surface 110 (FIG. 3) on the shoulder 90 of the blocking member 84 by the counterclockwise rotation of the cam 62. A biasing spring 112 urges the blocking member 84 into abutting engagement with a stop 114 and holds the blocking member 84 against rotation with the reel shaft 26.

If the safety belt 12 is retracted through a short distance, for example, one half of an inch, the reel shaft 26, ratchet wheel 54 and cam 62 rotate through a short distance in a clockwise direction, as viewed in FIG. 3. This rotation of the cam 62 results from the frictional engagement of the cam 62 with the reel shaft 26 and ratchet wheel 54. This clockwise rotation of the cam 62 causes the lug 108 on the cam 62 to move a short distance away from the shoulder 90 on the blocking member 84.

After the safety belt 12 has been positioned across the torso of an occupant of a vehicle, the push button assembly 94 is manually depressed to engage the comfort assembly 50. Upon depression of the push button assembly 94 the head end portion 100 engages the actuator portion 88 of the blocking member 84 and rotates the blocking member 84 about the central axis of the reel shaft 26. This moves the actuator portion 88 downwardly (as viewed in FIG. 3) until it engages a stop 120 (FIG. 4).

Figure 4:
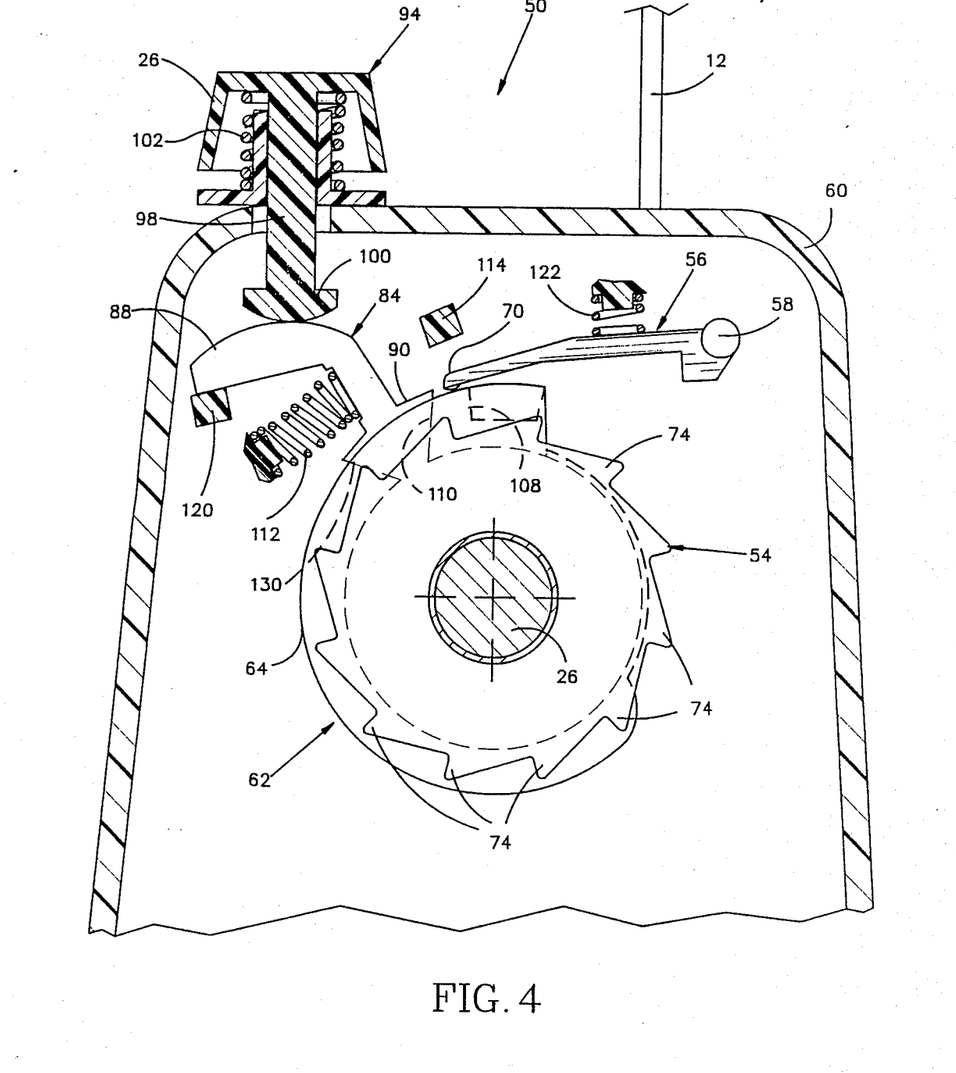
FIG. 4 is a side elevational view, similar to FIG. 3, illustrating the manner in which a push button is manually actuated to initiate engagement of the comfort assembly.

As the blocking member 84 rotates about the reel shaft 26 from the blocking condition position shown in FIG. 3 to the retracted condition shown in FIG. 4, the shoulder 90 on the blocking member moves out from under the end portion 70 of the pawl 56 (FIG. 4). Although the shoulder 90 on the blocking member 84 has moved out from under the end portion 70 of the pawl 56, the pawl 56 cannot engage the ratchet wheel 54. This is because the arcuate blocking surface 64 on the cam 62 is disposed between the end portion 70 of the pawl 56 and the ratchet wheel 54 (FIG. 4). A biasing spring 122 presses the end portion 70 of the pawl 56 against the blocking surface 64 of the cam 62.

Figure 5:
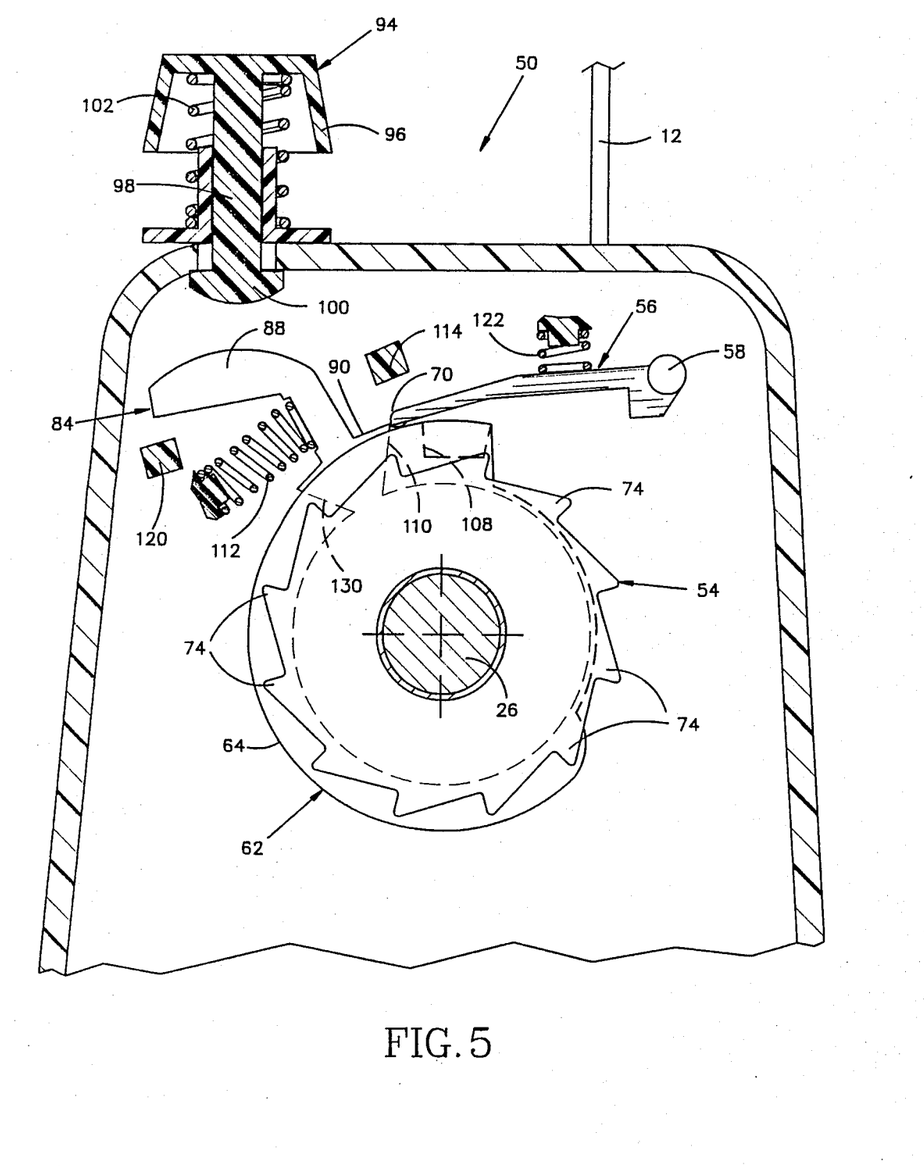
FIG. 5 is a side elevational view, similar to FIG. 4, illustrating the manner in which a blocking member engages the end of a tension relief pawl when the push button is released.

When the push button assembly 94 is released, the coil spring 102 returns the push button assembly to its unactuated condition (FIG. 5). At the same time, the biasing spring 112 moves the blocking member 84 in a clockwise direction about the reel shaft 26. The shoulder 90 on the blocking member 84 projects above the blocking surface 64 on the cam 62. Therefore, as the blocking member 84 moves in a clockwise direction about the reel shaft 26, the leading end surface 110, of the shoulder 90 moves into abutting engagement with the end portion 70 of the pawl 56 (FIG. 5). This stops movement of the blocking member 84 short of the stop 114 with the blocking member disposed to one side of the pawl 56.

In order to engage the pawl 56 with the ratchet wheel 54, it is necessary to rotate the reel 24, ratchet wheel 54 and cam 62 in the belt retraction direction through at least a major portion of a revolution of the reel. Thus, the reel shaft 26, ratchet wheel 54 and cam 62 are rotated together, in a clockwise direction, from the position shown in FIG. 5 to the position shown in FIG. 6 during retraction of the belt. During clockwise rotation of the cam 62 from the position shown in FIG. 5 to the position shown in FIG. 6, the nose or end portion 70 of the pawl 56 engages the blocking surface 64 on the cam. This holds the pawl 56 out of engagement with the ratchet wheel 54.

Figure 6:
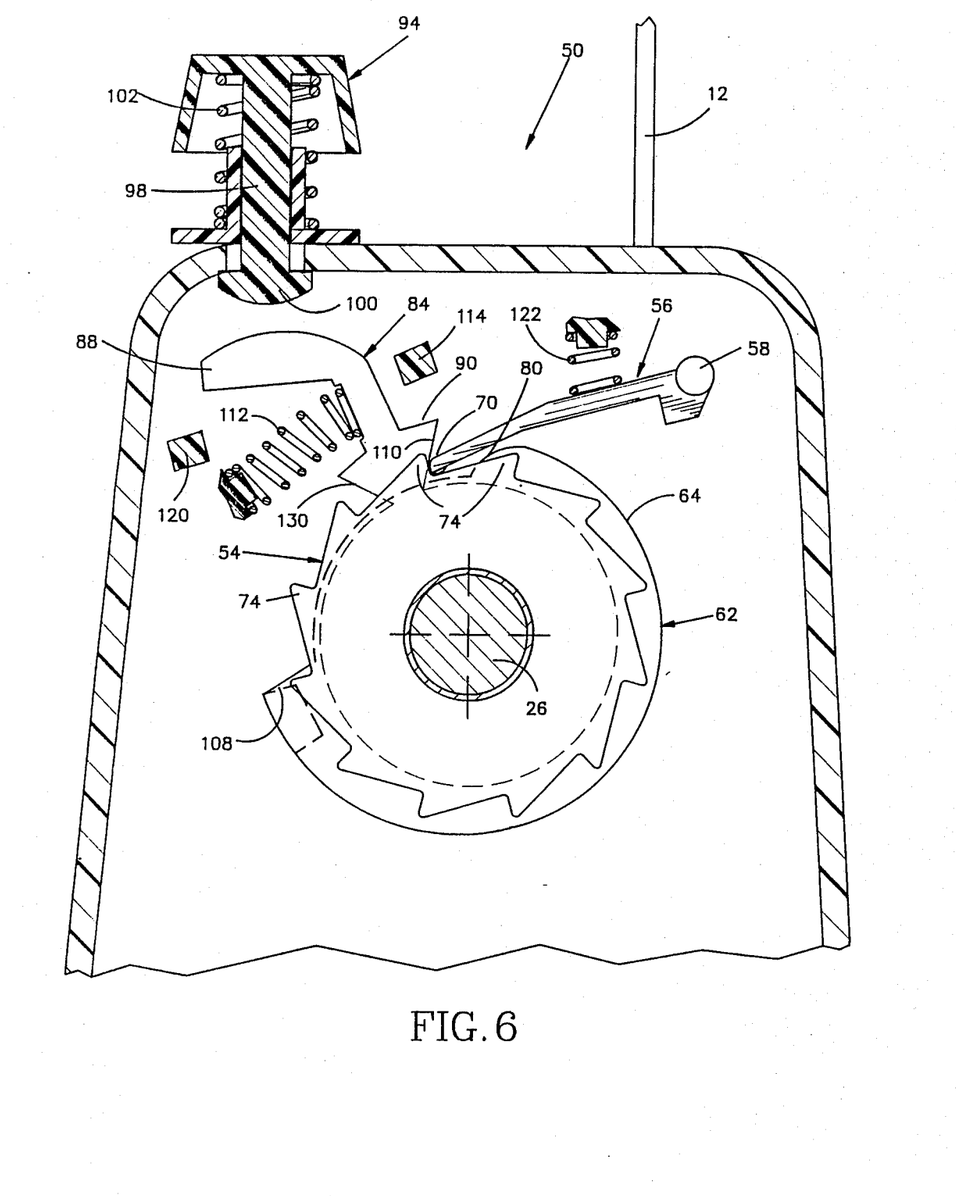
FIG. 6 is a side elevational view, similar to FIG. 5, illustrating the comfort assembly in an engaged condition in which the tension relief pawl engages a ratchet wheel.

After the reel shaft 26, cam 62 and ratchet wheel 54 have been rotated together through approximately 240° from the position shown in FIG. 5 to the position shown in FIG. 6, the leading end portion 70 of the pawl 56 engages a tooth 74 on the ratchet wheel 54. The force exerted by the reel biasing spring 32 is then transmitted through the reel shaft 26 and ratchet wheel 54 to the pawl 56. Therefore, the tension in the safety belt 12 and pressure against the torso of the occupant of the vehicle is eliminated.

Figure 7:
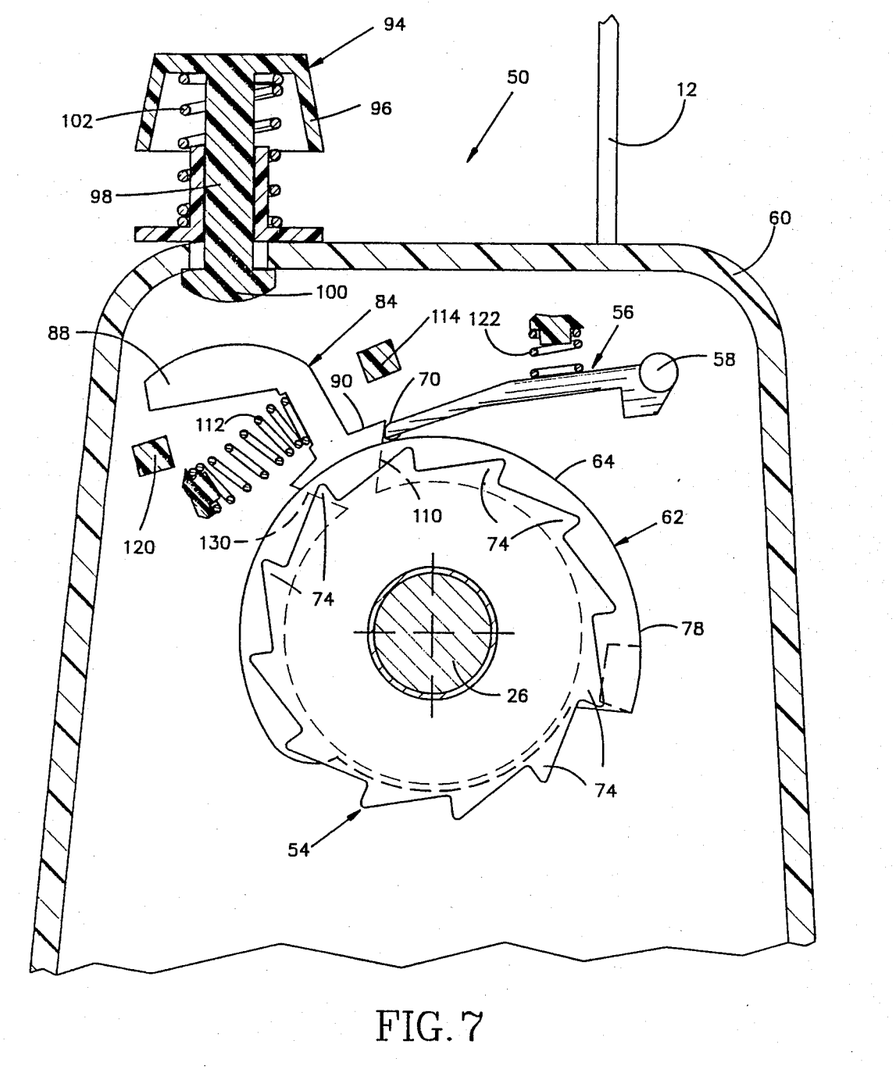
FIG. 7 is a side elevational view illustrating the manner in which the tension relief pawl is held out of engagement with the ratchet wheel by a cam to accommodate limited movement of an occupant of the vehicle.

When the comfort assembly 50 is in its engaged condition of FIG. 6 and an occupant of a vehicle moves through a limited distance, a short length of the belt 12 is unwound from the reel 24. As this occurs, the pawl release or ramp section 80 of the cam 62 is rotated in a counterclockwise direction (as viewed in FIG. 6) about the central axis of the reel shaft 26 with the ratchet wheel 54. The leading end portion 70 of the pawl 56 is moved out of engagement with the ratchet wheel teeth 74 by cam 62 and into engagement with the blocking surface 64 of the cam (FIG. 7).

As soon as the end portion 70 of the pawl 56 is lifted out of engagement with the ratchet wheel teeth 74 by the cam 62, the biasing force of the reel spring 32 is transmitted to the safety belt 12. The blocking surface 64 on the cam 62 holds the pawl 56 out of engagement with the ratchet wheel 54 as the ratchet wheel is rotated in a counterclockwise direction (as viewed in FIGS. 6 and 7) as a result of forward motion of the occupant. At this time, the shoulder 90 of the blocking member 84 is prevented from moving beneath the leading end portion of the pawl 56 by engagement of the surface 110 on the shoulder 90 of the blocking member 84 with the end portion 70 of the pawl 56.

After a short length of the belt 12 is withdrawn by limited movement of the occupant and the occupant returns to his original position, the safety belt 12 is retracted back onto the reel 24 by the action of the biasing spring 32. As this occurs, the reel shaft 26, cam 64 and ratchet wheel 54 rotate in a clockwise direction (as viewed in FIG. 7). When the length of the belt which was extended to accommodate limited movement of the occupant of the vehicle has again been retracted onto the reel 24, the pawl 56 will again engage the ratchet wheel 54 in the manner shown in FIG. 6. At this time, the tension of the reel spring 32 is transmitted to the pawl 56 to eliminate pressure of the safety belt 12 against the torso of an occupant of the vehicle.

If movement of the occupant of the vehicle causes more than a predetermined short length of safety belt 12 to be withdrawn from the reel 24, the comfort assembly 50 is operated from the engaged condition of FIG. 6 to the disengaged condition of FIG. 3. As the safety belt 12 is extended, the reel shaft 26, ratchet wheel 54 and cam 62 rotate in a counterclockwise direction from the position shown in FIG. 6 past the position shown in FIG. 7. As this occurs, the lift section 78 of the blocking surface 64 on the cam 62 moves the end portion 70 of the pawl 56 radially outwardly from the position shown in FIG. 7 to the position shown in FIG. 3. The blocking member biasing spring 112 then moves the shoulder 90 on the blocking member beneath the end portion 70 of the pawl 56 (FIG. 3). This movement of the pawl 56 is accomplished by having the radius of the blocking surface 64 increase in the lift section 78 to a radius which is slightly larger than the radius of the shoulder 90 on the blocking member 84. Therefore, as the pawl 56 is pivoted outwardly by the lift section 78 of the cam 62, the biasing spring 112 can move the shoulder 90 beneath the slightly rounded end portion 70 of the pawl 56.

After the comfort assembly 50 is operated from the engaged condition of FIG. 6 to the disengaged condition of FIG. 3 by the extension of more than a predetermined short length of the safety belt 12, the comfort assembly cannot again be actuated to the engaged condition without manual actuation of the push button assembly 94. This is because the shoulder 90 on the blocking member 84 has moved between the end portion 70 of the pawl 56 and the ratchet wheel 54.

Alternative Operation

The foregoing description of the manner in which the comfort assembly 50 is engaged assumed that the push button assembly 94 was manually actuated before retraction of the safety belt 12. However, it is contemplated that an occupant of a vehicle may withdraw a relatively large length of the safety belt, allow a portion of the safety belt to be retracted back onto the spool 24, and then actuate the push button assembly 94. When this is done, the comfort assembly 50 returns to the disengaged condition shown in FIG. 3 during the extension of a relatively large length of belt. During the extension of the belt, the reel shaft 26 and ratchet wheel 54 rotate in a counterclockwise direction while the blocking member 84 engages the cam lug 108 to block counterclockwise rotation of the cam 62 with the ratchet wheel.

As the safety belt 12 is retracted, the reel shaft 26, ratchet wheel 54 and cam 62 rotate in a clockwise direction from the position shown in FIG. 3. The cam 62 rotates in the clockwise direction with the ratchet wheel 54 until the leading side of the cam lug 108 engages a left (as viewed in FIG. 3) end surface 130 of the shoulder 90 on the blocking member 84. Thus, the cam 62 rotates in a clockwise direction through approximately 315° from the position shown in FIG. 3. After the lug 108 moves into engagement with the end surface 130 on the shoulder 90 of the blocking member 84, continued retraction of the safety belt merely results in the reel shaft 26 and ratchet wheel 54 being rotated in a clockwise direction relative to both the cam 62 and blocking member 84.

During this retraction of the safety belt 12, the actuator section 88 of the blocking member 84 is disposed in abutting engagement with the stop 114. The shoulder 90 of the blocking member 84 is disposed beneath the end portion 70 of the pawl 56. Therefore, the pawl 56 cannot engage the ratchet wheel 54.

After the safety belt 12 is retracted through a distance sufficient to move the lug 108 on the cam 62 into engagement with the end surface 130 on the shoulder 90 and the blocking member 84, the push button assembly 94 can be actuated at any time to operate the comfort assembly 50 to its engaged condition. Actuation of the push button assembly 94 rotates the blocking member 84 to move the shoulder 90 out from beneath the pawl 56. This enables the pawl 56 to engage a tooth 74 on the ratchet wheel 54.

From the above description of a preferred embodiment of the invention, those skilled in the art will perceive improvements, changes and modifications. Such improvements, changes and modifications within the skill of the art are intended to be covered by the appended claims.

Having described my invention, I claim:

1. An apparatus for use in association with a vehicle safety belt, said apparatus comprising:
   rotatable reel means for storing the belt;
   spring means for urging said reel means to rotate in a belt retraction direction;
   a ratchet wheel fixedly connected with said reel means for rotation therewith;
   a pawl movable from a disengaged position spaced from said ratchet wheel to an engaged position in which said pawl engages said ratchet wheel to prevent rotation of said reel in the belt retraction direction and allow rotation of said reel in the belt withdrawal direction;
   a blocking member movable between a blocking condition blocking engagement of said pawl with said ratchet wheel and a retracted condition in which said blocking member is ineffective to block engagement of said pawl with said ratchet wheel;
   manually actuatable means for moving said blocking member to its retracted condition; and
   a cam having an arcuate blocking surface coextensive with a portion of the circumference of said ratchet wheel to block engagement of said pawl with said ratchet wheel, said cam being rotatable with said ratchet wheel from a first condition in which said blocking surface blocks engagement of said pawl with said ratchet wheel to a second condition in which said blocking surface is ineffective to block engagement of said pawl with said ratchet wheel, said cam also having an actuating surface for contacting the pawl when in its engaged position and for moving the pawl from its engaged position to its disengaged position upon a predetermined amount of rotation of the reel in the belt withdrawal direction.

2. An apparatus as set forth in claim 1 wherein said pawl has an end portion which is engageable with said blocking member when said blocking member is in the blocking condition, said end portion of said pawl being engageable with said blocking surface of said cam when said blocking member is in the retracted condition and said cam is in the first condition, said end portion of said pawl being engageable with said ratchet wheel when said blocking member is in the retracted condition and said cam is in the second condition.

3. An apparatus as set forth in claim 1 wherein said ratchet wheel, cam and blocking member are disposed in a coaxial relationship with said reel.

4. An apparatus for use in association with a vehicle safety belt, said apparatus comprising:
   rotatable reel means for storing the belt;
   spring means for urging said reel means to rotate in a belt retraction direction;
   tension relieving means operable between an engaged condition blocking rotation of said reel means in the belt retraction direction under the influence of said spring means and allowing rotation of said reel means in the belt withdrawal direction and a disengaged condition in which said tension relieving means is ineffective to block rotation of said reel means under the influence of said spring means;
   said tension relieving means including manually actuatable means separate from the belt for initiating operation of said tension relieving means from the disengaged condition to the engaged condition and means for blocking operation of said tension relieving means from the disengaged condition to the engaged condition until the belt has been at least partially withdrawn from said reel means and said reel means rotated back in the belt retraction direction through at least a major portion of a revolution of said reel means.

5. An apparatus as set forth in claim 4 further including means for operating said tension relieving means from the engaged condition to the disengaged condition in response to rotation of said reel means due to withdrawal from said reel means of a length of belt which is less than a predetermined length when said tension relieving means is in the engaged condition and for operating said tension relieving means from the disengaged condition back to the engaged condition independently of said manually actuatable means upon rotation of said reel means due to retraction of the safety belt.

6. An apparatus as set forth in claim 4 wherein said tension relieving means includes a ratchet wheel connected with said reel means for rotation therewith, and a pawl which is movable from a disengaged position spaced from said ratchet wheel to an engaged position in which an end portion of said pawl engages said ratchet wheel upon operation of said tension relieving means from the disengaged condition to the engaged condition, said means for blocking operation of said tension relieving means from the disengaged condition to the engaged condition including cam means having an arcuate blocking surface which is coextensive with a major portion of the circumference of said ratchet wheel to block engagement of said end portion of said pawl with a major portion of the circumference of said ratchet wheel, said cam means being rotatable with said ratchet wheel from a first condition in which said blocking surface is between said end portion of said pawl and said ratchet wheel to a second condition in which said blocking surface is offset from said end portion of said pawl to enable said end portion of said pawl to engage said ratchet wheel, said cam means being rotatable with said ratchet wheel from the first condition to the second condition upon rotation of said reel means in the belt retraction direction.

7. An apparatus as set forth in claim 6 wherein said cam means is rotatable with said ratchet wheel from the second condition toward the first condition to disengage said end portion of said pawl from said ratchet wheel to enable said spring means to tension the safety belt.

8. An apparatus as set forth in claim 4 wherein said tension relieving means includes a ratchet wheel connected with said reel means for rotation therewith, a pawl which is engageable with said ratchet wheel, and biasing means for urging said pawl toward said ratchet wheel, said manually actuatable means including a blocking member which is movable between a blocking condition in which said blocking member blocks engagement of said pawl with said ratchet wheel and a retracted condition in which said blocking member is ineffective to block engagement of said pawl with said ratchet wheel.

9. An apparatus as set forth in claim 8 wherein said means for blocking operation of said tension relieving means from the disengaged condition to the engaged condition until the safety belt has been at least partially withdrawn from said reel means and said reel means has been rotated back in the safety belt retraction direction includes cam means having an arcuate blocking surface which is coextensive with a major portion of the circumference of said ratchet wheel and which rotates with said ratchet wheel to block engagement of said pawl with said ratchet wheel until said reel means is rotated back through at least a major portion of a revolution of said reel means.

10. An apparatus as set forth in claim 9 wherein said pawl has an end portion which is engageable with said blocking member when said blocking member is in the blocking condition to block engagement of said pawl with said ratchet wheel, said end portion of said pawl being engageable with said blocking surface of said cam means to block engagement of said pawl with said ratchet wheel after movement of said blocking member to the retracted condition until said reel means is rotated back through at least a major portion of a revolution of said reel means in the safety belt retraction direction.

11. An apparatus for use in association with a vehicle safety belt, said apparatus comprising:
rotatable reel means for storing the belt;
spring means for urging said reel means to rotate in a belt retraction direction;
a ratchet wheel fixedly connected with said reel means for rotation therewith;
a pawl movable from a disengaged position spaced from said ratchet wheel to an engaged position in which said pawl engages said ratchet wheel to prevent rotation of said reel in the belt retraction direction;
a blocking member movable between a blocking condition blocking engagement of said pawl with said ratchet wheel and a retracted condition in which said blocking member is ineffective to block engagement of said pawl with said ratchet wheel;
manually actuatable means for moving said blocking member to its retracted condition;
a cam having an arcuate blocking surface coextensive with a portion of the circumference of said ratchet wheel to block engagement of said pawl with said ratchet wheel, said cam being rotatable with said ratchet wheel from a first condition in which said blocking surface blocks engagement of said pawl with said ratchet wheel to a second condition in which said blocking surface is ineffective to block engagement of said pawl with said ratchet wheel, said cam also having an actuating surface for contacting the pawl when in its engaged position and for moving the pawl from its engaged position to its disengaged position upon a predetermined amount of rotation of the reel in the belt withdrawal direction; and
spring means for urging said blocking member from the retracted condition to the blocking condition, said pawl including surface means for blocking movement of said blocking member from the retracted condition to the blocking condition under the influence of said spring means.

12. An apparatus as set forth in claim 11 wherein said blocking member includes first surface means engageable with said pawl for blocking movement of said pawl to the engaged position when said blocking member is in the blocking condition, said blocking member having second surface means engageable with said pawl for blocking movement of said blocking member from the retracted condition to the blocking condition when said pawl is in the engaged position.

13. An apparatus for use in association with a vehicle safety belt, said apparatus comprising:
rotatable reel means for storing the belt;
spring means for urging said reel means to rotate in a belt retraction direction;
tension relieving means operable between an engaged condition blocking rotation of said reel means in the belt retraction direction under the influence of said spring means and a disengaged condition in which said tension relieving means is ineffective to block rotation of said reel means under the influence of said spring means;
said tension relieving means including manually actuatable means separate from the belt for initiating operation of said tension relieving means from the disengaged condition to the engaged condition and means for blocking operation of said tension relieving means from the disengaged condition to the engaged condition until the belt has been at least partially withdrawn from said reel means and said reel means rotated back in the belt retraction direction through at least a major portion of a revolution of said reel means;

means for operating said tension relieving means from the engaged condition to the disengaged condition in response to rotation of said reel means due to withdrawal from said reel means of a length of belt which is less than a predetermined length when said tension relieving means is in the engaged condition and for operating said tension relieving means from the disengaged condition back to the engaged condition independently of said manually actuatable means upon rotation of said reel means due to the retraction of the safety belt; and means for operating said tension relieving means from the engaged condition to the disengaged condition in response to withdrawal from said reel means of a length of belt which exceeds the predetermined length and for maintaining said tension relieving means in the disengaged condition at least until said manually actuatable means is again actuated.

14. An apparatus for use in association with a vehicle safety belt, said apparatus comprising:

rotatable reel means for storing the belt;

spring means for urging said reel means to rotate in a belt retraction direction; and tension relieving means operable between an engaged condition blocking rotation of said reel means in the belt retraction direction under the influence of said spring means and a disengaged condition in which said tension relieving means is ineffective to block rotation of said reel means under the influence of said spring means;

said tension relieving means including manually actuatable means separate from the belt for initiating operation of said tension relieving means from the disengaged condition to the engaged condition and means for blocking operation of said tension relieving means from the disengaged condition to the engaged condition until the belt has been at least partially withdrawn from said reel means and said reel means rotated back in the belt retraction direction through at least a major portion of a revolution of said reel means;

said tension relieving means including a ratchet wheel connected with said reel means for rotation therewith, a pawl which is engageable with said ratchet wheel, and biasing means for urging said pawl toward said ratchet wheel, said manually actuatable means including a blocking member which is movable between a blocking condition in which said blocking member blocks engagement of said pawl with said ratchet wheel and a retracted condition in which said blocking member is ineffective to block engagement of said pawl with said ratchet wheel;

said manually actuatable means including push button means for pivoting said blocking member around the axis of rotation of said reel means to move said member from the blocking condition to the retracted condition.

15. An apparatus for use in association with a vehicle safety belt, said apparatus comprising:

rotatable reel means for storing the belt;

spring means for urging said reel means to rotate in a belt retraction direction;

tension relieving means operable between an engaged condition blocking rotation of said reel means in the belt retraction direction under the influence of said spring means and a disengaged condition in which said tension relieving means is ineffective to block rotation of said reel means under the influence of said spring means;

said tension relieving means including manually actuatable means separate from the belt for initiating operation of said tension relieving means from the disengaged condition to the engaged condition and means for blocking operation of said tension relieving means from the disengaged condition to the engaged condition until the belt has been at least partially withdrawn from said reel means and said reel means rotated back in the belt retraction direction through at least a major portion of a revolution of said reel means;

said tension relieving means including a ratchet wheel connected with said reel means for rotation therewith, a pawl which is engageable with said ratchet wheel, and biasing means for urging said pawl toward said ratchet wheel, said manually actuatable means including a blocking member which is movable between a blocking condition in which said blocking member blocks engagement of said pawl with said ratchet wheel and a retracted condition in which said blocking member is ineffective to block engagement of said pawl with said ratchet wheel;

wherein said means for blocking operation of said tension relieving means from the disengaged condition to the engaged condition until the safety belt has been at least partially withdrawn from said reel means and said reel means has been rotated back in the safety belt retraction direction includes cam means having an arcuate blocking surface which is coextensive with a major portion of the circumference of said ratchet wheel and which rotates with said ratchet wheel to block engagement of said pawl with said ratchet wheel until said reel means is rotated back through at least a major portion of a revolution of said reel means;

wherein said pawl has an end portion which is engageable with said blocking member when said blocking member is in the blocking condition to block engagement of said pawl with said ratchet wheel, said end portion of said pawl being engageable with said blocking surface on said cam means to block engagement of said pawl with said ratchet wheel after movement of said blocking member to the retracted condition until said reel means is rotated back through at least a major portion of a revolution of said reel means in the safety belt retraction direction; and second spring means for urging said blocking member toward the blocking condition, said pawl having surface means for engaging said blocking member to block movement of said blocking member to the blocking condition when said pawl is in engagement with the blocking surface on said cam means and when said pawl is in engagement with said ratchet wheel.

* * * * *

UNITED STATES PATENT AND TRADEMARK OFFICE
CERTIFICATE OF CORRECTION

PATENT NO. : 4,854,522

DATED : August 8, 1989

INVENTOR(S) : Louis R. Brown; Wallace C. Higbee

It is certified that error appears in the above-identified patent and that said Letters Patent is hereby corrected as shown below:

On the title page in the assignee change "Tyndhurst, Ohio" to --Lyndhurst, Ohio--.

Signed and Sealed this

Nineteenth Day of June, 1990

Attest:

HARRY F. MANBECK, JR.

*Attesting Officer*    *Commissioner of Patents and Trademarks*